May 3, 1938.  F. X. LAMB  2,116,154
ELECTRICAL MEASURING INSTRUMENT
Filed July 15, 1936
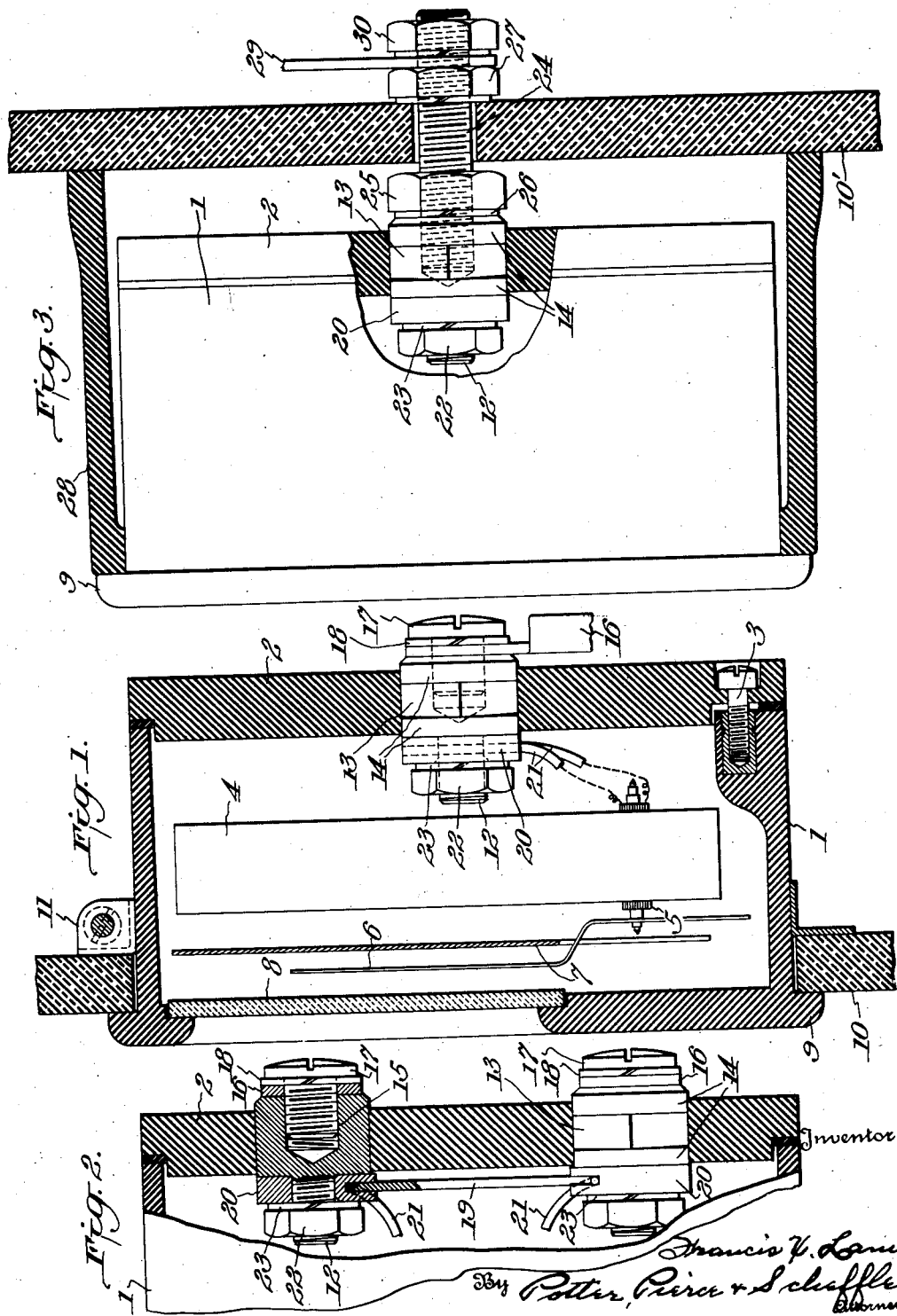

Patented May 3, 1938

2,116,154

UNITED STATES PATENT OFFICE 2,116,154

ELECTRICAL MEASURING INSTRUMENT

Francis X. Lamb, East Orange, N. J., assignor to Weston Electrical Instrument Corporation, Newark, N. J., a corporation of New Jersey Application July 15, 1936, Serial No. 90,806

3 Claims. (Cl. 171—95)

This invention relates to electrical measuring instruments, and particularly to the casing, the terminals, and other structural details for adapting the instruments for either flush or surface mounting on a panel.

It is usual to provide soldering lugs for connecting leads to an instrument of the flush mounting type, and to provide threaded terminal studs in the case of surface mounted instruments, the terminal studs also serving to support the instrument upon the panel. The customary instrument designs do not permit of an alternative mounting of the instrument upon or flush with the panel, and the usual practice has been to manufacture two types of instrument casings in which a standard instrument movement may be mounted. Furthermore, some types of ammeters with internal shunts have been open to the objection that a slight relative movement of the terminal studs and shunt in tightening nuts upon the studs to mount the instrument would result in a buckling or breaking of the shunt.

Objects of this invention are to provide electrical measuring instruments having casings and terminals of such design that the instruments are adapted for either flush or surface mounting upon a panel. An object is to provide instruments of the type stated in which the casing and terminal arrangements permit adaptation of the instrument for different types of mounting without opening the instrument casing. A further object is to provide electrical measuring instruments, specifically ammeters having internal shunts, in which the shunts and terminal studs are of such mechanical design that a tightening of nuts upon the studs will not result in any stress upon the shunts. More specifically, an object of the invention is to provide electrical measuring instruments having casings designed for flush mounting, with threaded terminal inserts mounted in the base of the casing for receiving bolts for attaching soldering terminals thereto or for receiving threaded terminal studs; a masking shell being preferably provided for improving the appearance of the casing in the case of a surface mounting.

These and other objects and advantages of the invention will be apparent from the following specification when taken with the accompanying drawing in which:

Fig. 1 is a side view, with parts in section, of an embodiment of the invention adapted for flush mounting on a panel;

Fig. 2 is a plan view of the same with parts shown in section; and

Fig. 3 is a side elevation of the same instrument mounted on the surface of a panel.

In the drawing, the reference numeral 1 identifies the cup-shaped shell which is secured to the insulating base 2 by screws 3 to form the casing for an electrical measuring instrument which includes a permanent magnet 4 and a pivoted coil 5. The coil carries a pointer 6 which is displaced over a scale plate 7 that is visible through the cover glass 8 of the shell 1. The instrument parts are supported upon the base 2 in known manner, and the structural details of these parts and their mounting are not essential features of the invention.

The casing or shell 1 has an outer peripheral flange 9 to adapt the same for flush mounting on a panel 10 by a clamping ring 11 or the like. Terminal inserts are anchored in the base 2 to adapt the instrument for flush mounting or alternatively for surface mounting. The inserts have threaded shanks 12 extending into the casing and non-circular portions 13, preferably of square cross-section, embedded in the base 2 to prevent rotation of the inserts. Circular portions 14 at opposite sides of the squared section 13 provide flat connector-receiving surfaces that are approximately flush with but preferably just outside the planes of the opposite faces of the base 2. The embedded section of the insert has a threaded bore 15 for receiving the appropriate elements for connecting the instrument to an external circuit. As shown in Fig. 1, these connections take the form of terminal lugs 16 which are secured to the inserts by bolts 17 and lock washers 18.

The illustrated instrument is an ammeter having an internal shunt 19 of the usual strip type which has terminal lugs 20 for mounting the same on the shanks 12 of the terminal inserts. The leads 21 to the instrument movement are secured to the lugs of the shunt in the usual manner and the shunt is secured to the shanks 12 of the inserts by nuts 22 and lock washers 23. Attention is directed to the fact that the shunt cannot be damaged by tightening the bolts 17 into the inserts since the inserts are anchored against rotation by the non-circular portions 13 that are embedded in the base 2 during the formation of the base when, as is the customary practice, the base 2 is a molded synthetic resin. This mounting of the shunt avoids the possibility of damage which is present when the shunt is mounted on terminal shanks which extend through openings in the base and are secured in place by nuts. No excess torque on the terminal inserts, short of that which destroys the base 2, will result in a stress on the shunt.

The instrument shown in Figs. 1 and 2 is also adapted for surface mounting on a panel merely by the substitution of another type of terminal connection and, preferably, a masking shell. This type of mounting is illustrated in Fig. 3. Studs 24 are threaded into the bores 15 of the inserts and are locked in place by nuts 25 and lock washers 26. The studs 24 extend through a panel 10' and receive nuts 27 for drawing the casing shell 1 against a masking shell 28 that has an inner end seated against the panel and an outer end for engagement with the flange 9 of the shell 1. The terminal lugs or straps 29 for connecting the instrument into an external circuit are secured to the studs 24 by nuts 30. The masking shell 28 is not essential in the case of surface mounting, but is desirable to avoid an unsightly gap between the instrument casing and the panel when, for a rigid mounting, the studs 24 are anchored to the terminal inserts by the nuts 25.

Instruments such as illustrated may be kept in stock for use either as flush or surface mounted instruments. It is not necessary to open the instrument casing to adapt the instrument for either type of mounting. Sets of bolts 17 and terminal lugs 16 may be kept in stock for filling orders for flush mounted instruments, and sets of studs 24 and shells 28 for filling orders for surface mounted instruments. These parts are of small bulk and are equally applicable to either voltmeters or ammeters, and to instruments of different ranges and electrical design.

It is to be understood that the invention is not restricted to the particular constructions herein shown and described, and various changes in the design, size and relation of the various parts may be made without departing from the spirit of my invention as set forth in the following claims.

I claim:

1. An electrical measuring instrument comprising a casing having a base and an outer peripheral flange adapting the same for flush mounting on a panel, an instrument movement within said casing, terminal inserts carried by said base and having threaded bores presented towards the exterior of the casing, mounting studs threaded into said inserts and carrying nuts, and a masking shell adapting said casing for surface mounting on a panel, said shell having opposite ends for seating respectively against said peripheral flange and a panel when the mounting studs are passed through openings in the panel.

2. An electrical measuring instrument for mounting on a panel, said instrument comprising a casing having an insulating base and an outer flange adapting the casing for flush mounting on a panel, an instrument movement mounted on said base, terminal means anchored in said base, and means including a masking shell for the surface mounting of the casing on a panel, said shell having ends for seating against said flange and a panel to enclose the casing and space the same from the panel.

3. An ammeter comprising a casing having an insulating base and an outer flange adapting the casing for flush mounting, an instrument movement mounted on said base, a pair of terminal inserts anchored in said base, said inserts having threaded shanks within said casing and threaded bores presented towards the exterior thereof, a shunt mounted on the threaded shanks of said inserts, and means for mounting said casing on the surface of a panel; said mounting means comprising studs threaded into said inserts and adapted to pass through the panel, and a masking shell enclosing said casing and having ends for seating against said outer flange and the panel to space the base of the casing from the panel.

FRANCIS X. LAMB.